(12) United States Patent
Lopez et al.

(10) Patent No.: US 11,070,414 B2
(45) Date of Patent: Jul. 20, 2021

(54) COMMUNICATION NODE AND METHOD FOR GENERATING MULTICARRIER SIGNALS BY BACKSCATTERING

(71) Applicant: Telefonaktiebolaget LM Ericsson (publ), Stockholm (SE)

(72) Inventors: Miguel Lopez, Solna (SE); Thomas Olsson, Karlshamn (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/646,232

(22) PCT Filed: Sep. 12, 2017

(86) PCT No.: PCT/EP2017/072819
§ 371 (c)(1),
(2) Date: Mar. 11, 2020

(87) PCT Pub. No.: WO2019/052625
PCT Pub. Date: Mar. 21, 2019

(65) Prior Publication Data
US 2021/0099331 A1 Apr. 1, 2021

(51) Int. Cl.
*H04L 27/26* (2006.01)
*H04L 25/08* (2006.01)
*H04W 72/04* (2009.01)

(52) U.S. Cl.
CPC .......... *H04L 27/2637* (2013.01); *H04L 25/08* (2013.01); *H04W 72/0453* (2013.01)

(58) Field of Classification Search
CPC ..... H04L 27/2637; H04L 25/08; H04L 27/04; H04W 72/0453; G06K 19/0723;
(Continued)

(56) References Cited

U.S. PATENT DOCUMENTS 5,640,683 A 6/1997 Evans et al.
9,514,402 B1 12/2016 Kim et al.
(Continued)

FOREIGN PATENT DOCUMENTS

WO 2015155520 A1 10/2015

OTHER PUBLICATIONS

N. Rajoria, H. Kamei, J. Mitsugi, Y. Kawakita and H. Ichikawa, "Multi-carrier backscatter communication system for concurrent wireless and batteryless sensing," 2017 International Conference on Wireless Communications, Signal Processing and Networking (WiSPNET) (Year: 2017).*
(Continued)

*Primary Examiner* — Sam K Ahn
*Assistant Examiner* — Amneet Singh
(74) *Attorney, Agent, or Firm* — Coats & Bennett, PLLC

(57) ABSTRACT

A wireless communication node (300) and method therein for generating multicarrier signals by means of backscattering in a wireless communication system (100) are disclosed. The wireless communication node (300) comprises a plurality A of antennas (310) configured to receive a radio frequency. The wireless communication node (300) further comprises a plurality A of switches (320), each switch has a number M of states. The wireless communication node (300) further comprises a number of impedance matrices (330), each impedance matrix comprising a number M of impedances (Z1, Z2 . . . ), each antenna is coupled to one of the impedance matrices (330) by one of the plurality A switches (320). The wireless communication node (300) further comprises a symbol mapper, a serial to parallel converter and one or more modulators (340) configured to generate a number A of baseband subcarrier signals based on data symbols (342) to be transmitted. The wireless communication node (300) further comprises one or more switch controller (350)

(Continued)

configured to control the states of the plurality A of switches (320) based on the generated baseband subcarrier signals such that each antenna impedance is selected among the number M of impedances (330), and thereby the received RF signal at each antenna is modulated by its specific frequency baseband subcarrier signal. A group of RF subcarrier signals is generated by reflecting the modulated RF signal from each antenna, and thereby the multicarrier signals are generated from the plurality A of antennas (310).

16 Claims, 10 Drawing Sheets

(58) Field of Classification Search
CPC ........... G06K 19/0724; G06K 19/0726; H01Q 1/2225; H03C 1/08
See application file for complete search history.

(56) References Cited

U.S. PATENT DOCUMENTS

| | | | |
|---|---|---|---|
| 2005/0215202 A1* | 9/2005 | Sugar | H04B 7/0857 455/69 |
| 2006/0220794 A1 | 10/2006 | Zhu | |
| 2007/0098092 A1 | 5/2007 | Mitran | |
| 2016/0365890 A1 | 12/2016 | Reynolds et al. | |

OTHER PUBLICATIONS

H. Liu, Y. Chen and W. Tzeng, "A Multi-Carrier UHF Passive RFID System," 2007 International Symposium on Applications and the Internet Workshops, Hiroshima, Japan, 2007, pp. 21-21, doi: 10.1109/SAINT-W.2007.9. (Year: 2007).*

M. Lee, C. Yao and H. Liu, "Passive Tag for Multi-carrier RFID Systems," 2011 IEEE 17th International Conference on Parallel and Distributed Systems, Tainan, Taiwan, 2011, pp. 872-876, doi: 10.1109/ICPADS.2011.97. (Year: 2011).*

Kimionis, J. et al., "Enhancement of RF Tag Backscatter Efficiency with Low-Power Reflection Amplifiers", IEEE Transactions on Microwave Theory and Techniques, vol. 62 No. 12, Dec. 1, 2014, pp. 3562-3571, IEEE.

Ensworth, J. et al., "Every Smart Phone is a Backscatter Reader: Modulated Backscatter Compatibility with Bluetooth 4.0 Low Energy (BLE) Devices", 2015 IEEE International Conference on RFID (RFID), Apr. 15, 2014, pp. 78-85, IEEE.

Thomas, S. et al., "Quadrature Amplitude Modulated Backscatter in Passive and Semipassive UHF RFID Systems", IEEE Transactions on Microwave Theory and Techniques, vol. 60 No. 4, Apr. 1, 2012, pp. 1175-1182, IEEE.

Kellogg, B. et al., "Passive Wi-Fi: Bringing Low Power to Wi-Fi Transmissions", Mar. 1, 2016, pp. 1-14, University of Washington.

* cited by examiner

COMMUNICATION NODE AND METHOD FOR GENERATING MULTICARRIER SIGNALS BY BACKSCATTERING

TECHNICAL FIELD

Embodiments herein relate to a wireless communication node and method therein for generating multicarrier signals. In particular, the embodiments relate to generation of multicarrier signals in a passive or semi-passive device by backscattering.

BACKGROUND

Semi-passive and passive transmitters have been used in various applications. Passive transmitters are powered entirely by the energy received from an incoming RF signal. Semi-passive transmitters have a battery and consume power to perform baseband processing, but lack a power amplifier and many other components present in a transmitter radio frequency (RF) signal chain. Thus, both passive and semi-passive transmitters are power efficient.

The main idea with the semi-passive and passive transmitters is to delegate the generation of RF carriers to an external node that is mains powered. This implies that no power-hungry power amplifiers, filters, mixers and other components are needed in the semi- or passive device. The semi-passive or passive devices generate transmitting signals by using an antenna mismatched to the incoming RF carrier signal, thus reflecting or backscattering the incoming radio waves, and by modulating the reflected electromagnetic waves in order to transmit data to a receiving unit.

Passive and semi-passive devices have good potential in Internet of Things (IoT) applications, due to their power efficiency. For example, in Kellog. et al., "*Passive WiFi: Bringing Low Power to Wi-Fi Transmissions*", University of Washington, it is shown how to implement a power efficient semi-passive device compliant with the IEEE 802.11b standard. In Ensworth J. F., Reynolds M. S., "*Every smart phone is a backscatter reader: Modulated backscatter compatibility with Bluetooth 4.0 Low Energy (BLE) devices*", Radio Frequency Identification (RFID), 2015 IEEE International Conference, 15-17 Apr. 2015, it is shown how to modify passive RFID tags so that the reflected signal can be received by ordinary off-the-shelf Bluetooth Low Energy (BLE) receivers.

A problem with passive and semi-passive generation of RF signals by means of backscattering is that the power of the reflected waves is usually quite small. This is especially an issue in unlicensed bands, where the RF tone generator has a transmitting power limited by regulations targeting short range devices, i.e. equivalent isotropically radiated power (EIRP) is limited to 30 dBm or less, depending on the region. Hence, the range of the passive/semi-passive devices is quite limited. This limits the usability of these type of devices.

As an example, if the RF generator is located at a distance of 5 meters from the semi-passive device and has a transmitting power of 14 dBm, then the backscattered power is approximately −42 dBm. As a comparison, the BLE specification ensures that BLE devices have a transmitting power varying between −20 dBm and +10 dBm.

SUMMARY

It is therefore an object of embodiments herein to provide an improved method and apparatus for passive and semi-passive generation of RF signals by means of backscattering in a wireless communication network.

According to a first aspect of embodiments herein, the object is achieved by a wireless communication node for generating multicarrier signals by means of backscattering in a wireless communication system. The wireless communication node comprises a plurality A of antennas configured to receive a radio frequency, RF, signal with a carrier frequency.

The wireless communication node further comprises a plurality A of switches, each switch has a number M of states.

The wireless communication node further comprises a number of impedance matrices, each impedance matrix comprising a number M of impedances, and each antenna is coupled to one of the impedance matrices by one of the plurality A switches.

The wireless communication node further comprises a symbol mapper, a serial to parallel converter and one or more modulators configured to generate a number A of baseband subcarrier signals based on data symbols to be transmitted. Each baseband subcarrier signal is generated with an antenna specific frequency for each one of the plurality A of antennas.

The wireless communication node further comprises one or more switch controller configured to control the states of the plurality A of switches based on the generated baseband subcarrier signals such that each antenna impedance is selected among the number M of impedances, and thereby the received RF signal at each antenna is modulated by its specific frequency baseband subcarrier signal. A group of RF subcarrier signals is generated by reflecting the modulated RF signal from each antenna and the multicarrier signals are generated from the plurality A of antennas.

According to a second aspect of embodiments herein, the object is achieved by a method performed in a wireless communication node for generating multicarrier signals by means of backscattering in a wireless communication node in a multicarrier wireless communication system.

The wireless communication node receives a radio frequency, RF, signal with a carrier frequency (fc) by a plurality A of antennas.

The wireless communication node generates a number A of baseband subcarrier signals based on data to be transmitted by a symbol mapper, a serial to parallel converter and one or more modulators. Each baseband subcarrier signal is generated with a specific frequency for each one of the plurality A antennas.

The wireless communication node controls states of a plurality A switches coupled to the plurality A antennas based on the generated baseband subcarrier signals such that each antenna impedance is selected among a number M of impedances, and thereby modulating the received RF signal at each antenna with its specific frequency baseband subcarrier signal.

The wireless communication node generates a group of RF subcarrier signals by reflecting the modulated RF signal from each antenna, and thereby generating the multicarrier signals from the plurality A antennas.

According to embodiments herein, multiple reflecting antennas are used to generate multicarrier signals. One subcarrier is generated from each antenna. Increasing the number of reflecting antennas increases substantially the transmission power of a wireless communication node, i.e. a passive or semi-passive device, at moderate increase in power consumption, thus allowing the extension of their transmitting range or data rate.

The utilization of multiple reflecting antennas has advantages in terms of improved coverage and/or higher data rates. Unlike classical active transmitters, the power consumption is increased only slightly when the number of antennas is increased, since there are no power amplifiers, filters or other power-hungry components in the transmitter chain. Doubling the number of antennas doubles the reflected power. That is, a power gain of up to 3 dB can be obtained when doubling the number of antennas.

It has been reported in prior art that a transmitter in passive Wi-Fi systems consumes several orders of magnitude less, e.g. 1000 times less, power than a transmitter in ordinary Wi-Fi systems. Even though increasing the number of antennas requires an increase in baseband processing and switching, the increase in power consumption should be tolerable in many IoT applications, given the magnitude of the transmitting power gains.

Therefore, the embodiments herein provide an improved method and apparatus for generation of RF signals in passive and semi-passive devices.

BRIEF DESCRIPTION OF THE DRAWINGS

Examples of embodiments herein are described in more detail with reference to attached drawings in which.

DETAILED DESCRIPTION

Figure 1:
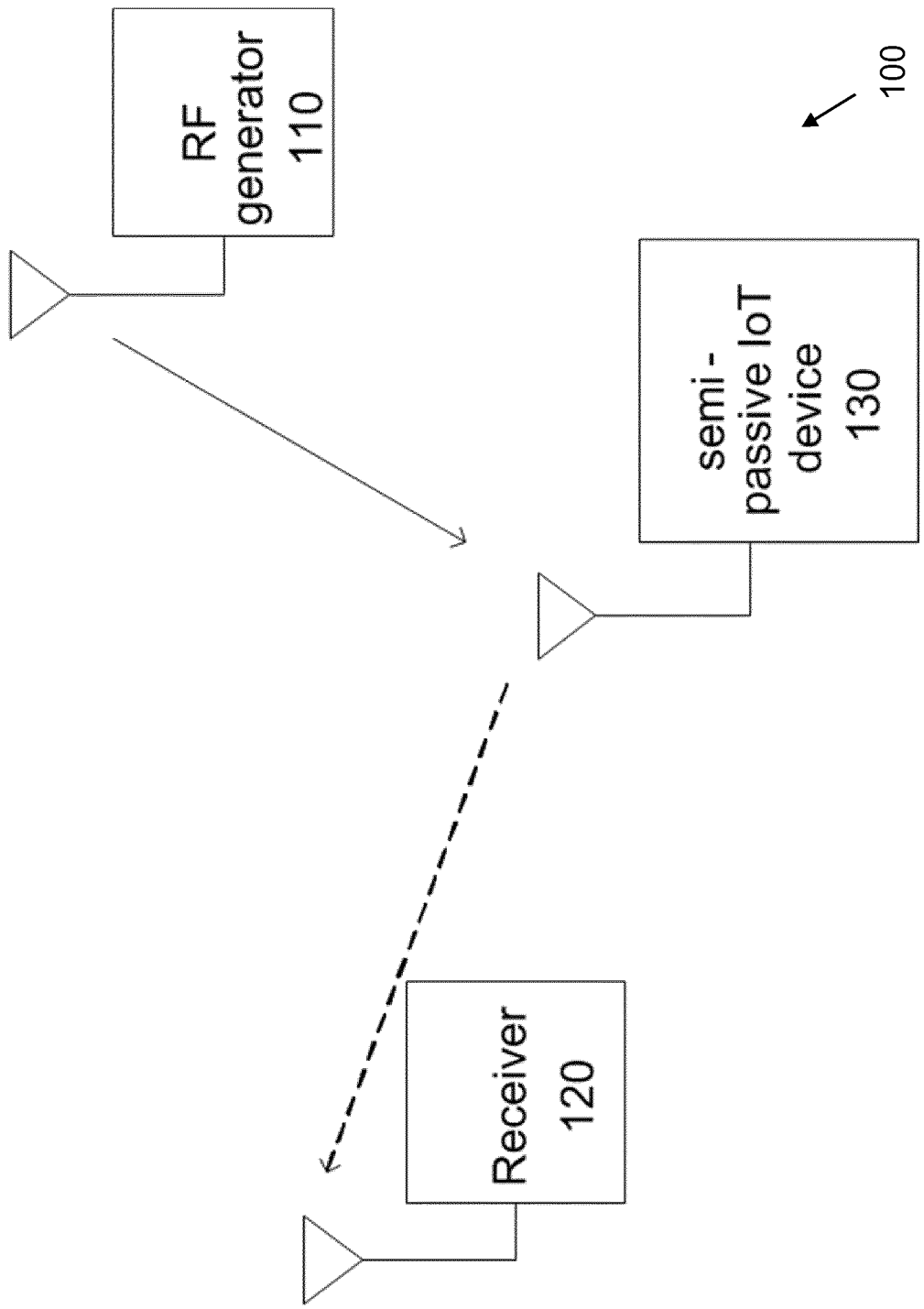
FIG. 1 is a schematic block diagram illustrating embodiments of a wireless communication network in which embodiments herein may be implemented.

FIG. 1 depicts an example of a wireless communication network 100 in which embodiments herein may be implemented. The wireless communication network 100 may be any wireless system or cellular network, such as a Long Term Evolution (LTE) network, any $3^{rd}$ Generation Partnership Project (3GPP) cellular network, Worldwide interoperability for Microwave Access (Wimax) network, Wireless Local Area Network (WLAN/Wi-Fi), an LTE advanced or Fourth Generation (4G) network, a Fifth Generation (5G) or New Radio (NR) network or Bluetooth/Bluetooth Low Energy (BLE) network etc.

The wireless communication network 100 comprises different types of wireless communication nodes, such as an RF generator 110, a receiver 120, a semi-passive or passive IoT device 130. The semi-passive or passive IoT device 130 receives an RF carrier signal from the RF generator 110 which is an external node that is mains powered. The RF generator 110 may be any device transmitting an RF signal at high enough power level and correct frequency to be used for RF reflection by the semi-passive device 130. The IoT device 130 generates transmitting signals by using an antenna mismatched to the incoming RF carrier signal, thus reflecting or backscattering the incoming radio waves and by modulating the reflected electromagnetic waves in order to transmit data to a receiving unit, e.g. the receiver 120. The dashed line indicates backscattered radio waves.

As part of developing embodiments herein, a semi-passive device related to prior art and principle of RF carrier generation by backscattering will first be described.

Figure 2:
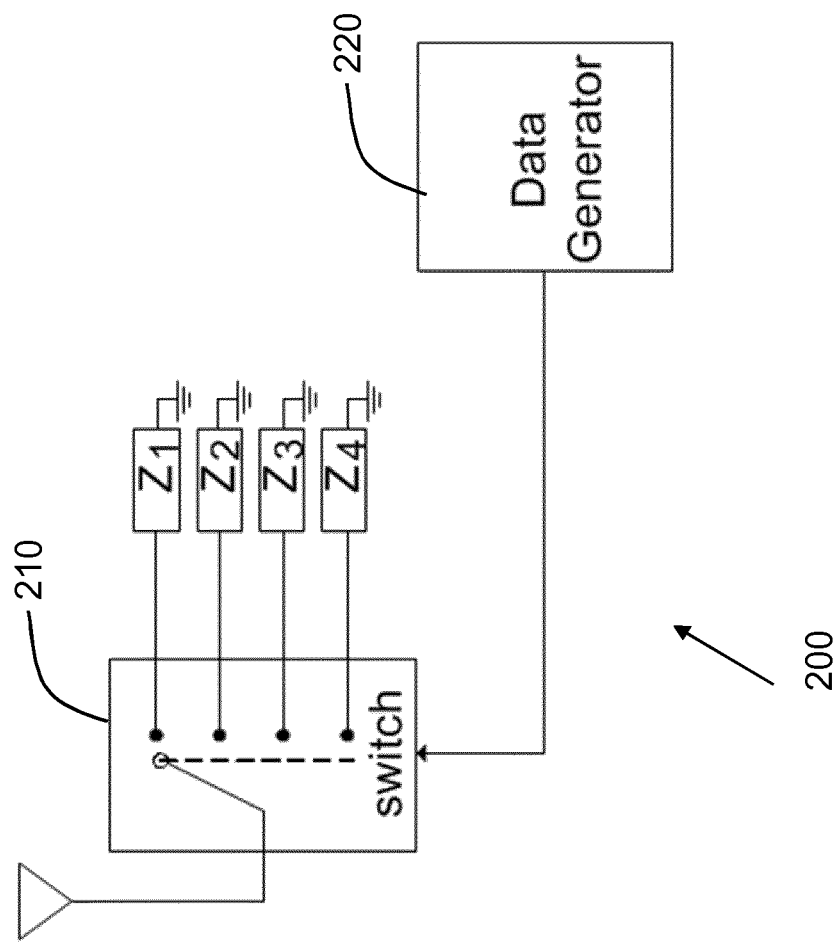
FIG. 2 is a schematic block diagram showing basic transmitter architecture of a semi-passive device.

FIG. 2 shows a basic transmitter architecture of a semi-passive device 200. The semi-passive device 200 comprises 4 antenna impedances, labeled Z1 to Z4, and one switch 210. Each impedance imparts a different phase shift to the reflected signal. By tuning these impedances it is possible to obtain any desired phase shifts, for example from a 4 Phase Shift Keying (PSK) constellation labeled 4PSK={0,π/2,π, 3π/2}. Table 1 illustrates an example of relation between antenna impedance and phase shifts.

TABLE 1

| Antenna impedance | Phase shift imparted on reflected wave [rads] |
|---|---|
| $Z_1$ | 0 |
| $Z_2$ | π/2 |
| $Z_3$ | π |
| $Z_4$ | 3π/2 |

The switch has 4 states, corresponding to the 4 impedances. A data generator 220 generates control signal to the switch 210 based on data to be transmitted. Thus, by modulating the state of the switch, 4-PSK can be employed to transmit data, simply by changing the state of the switch at the baud rate.

In summary, given a data symbol $\varphi_k \in$ 4PSK, a switch chooses an antenna impedance Zi such that an incoming RF carrier signal, $\cos(2\pi f_c t)$ with frequency $f_c$, results in a reflected radio wave $\cos(2\pi f_c t + \varphi_k)$.

This idea can be modified or extended, and more general modulations, including M-ary Quadrature Amplitude Modulation (M-QAM), can be generated by backscattering. A simpler transmitter with a two-state switch and two impedances is enough to generate Binary PSK (BPSK) or On-Off Keying (OOK).

Example of embodiments of a wireless communication node for generating multicarrier signals by means of backscattering in a wireless communication network 100 will now be described with reference to FIG. 3.

According to one embodiment, the wireless communication node 300 comprises a plurality A of antennas 310 configured to receive a radio frequency (RF) signal with a carrier frequency $f_c$.

The wireless communication node 300 further comprises a plurality A of switches 320, each switch has a number M of states.

The wireless communication node 300 further comprises a number of impedance matrices 330, each impedance matrix comprises a number M of impedances Z1, Z2 . . . . Each antenna is coupled to one of the impedance matrices by one of the plurality A of switches 320.

The wireless communication node 300 further comprises a symbol mapper, a serial to parallel converter and one or more modulators 340 configured to generate a number A of baseband subcarrier signals based on data symbols 342 to be transmitted. Each baseband subcarrier signal is generated with an antenna specific frequency, $k_a \cdot \Delta f$, $a=1, 2, 3, \ldots A$, A and $k_a$ are integers, for each one of the plurality A of antennas.

The wireless communication node 300 further comprises one or more of switch controllers 350 configured to control the states of the plurality A of switches 320 based on the generated baseband subcarrier signals such that each antenna impedance is selected among the number M of impedances, and thereby the received RF signal at each antenna is modulated by its specific frequency baseband subcarrier signal. A group of RF subcarrier signals is generated by reflecting the modulated RF signal from each antenna, and thereby the multicarrier signals are generated from the plurality A of antennas 310.

According to some embodiments, the frequencies of the baseband subcarrier signals may be chosen such that frequencies of the RF subcarriers generated from each antenna have a centre of frequency corresponding to a centre of frequency of a subcarrier in the multicarrier wireless system 100.

According to some embodiments, each group of RF subcarrier signals comprises one RF subcarrier signal and each antenna generates a different RF subcarrier signal.

According to some embodiments, the centre frequency of the received RF signal corresponds to one frequency in a channel raster of the multicarrier wireless communication system.

Figure 3:
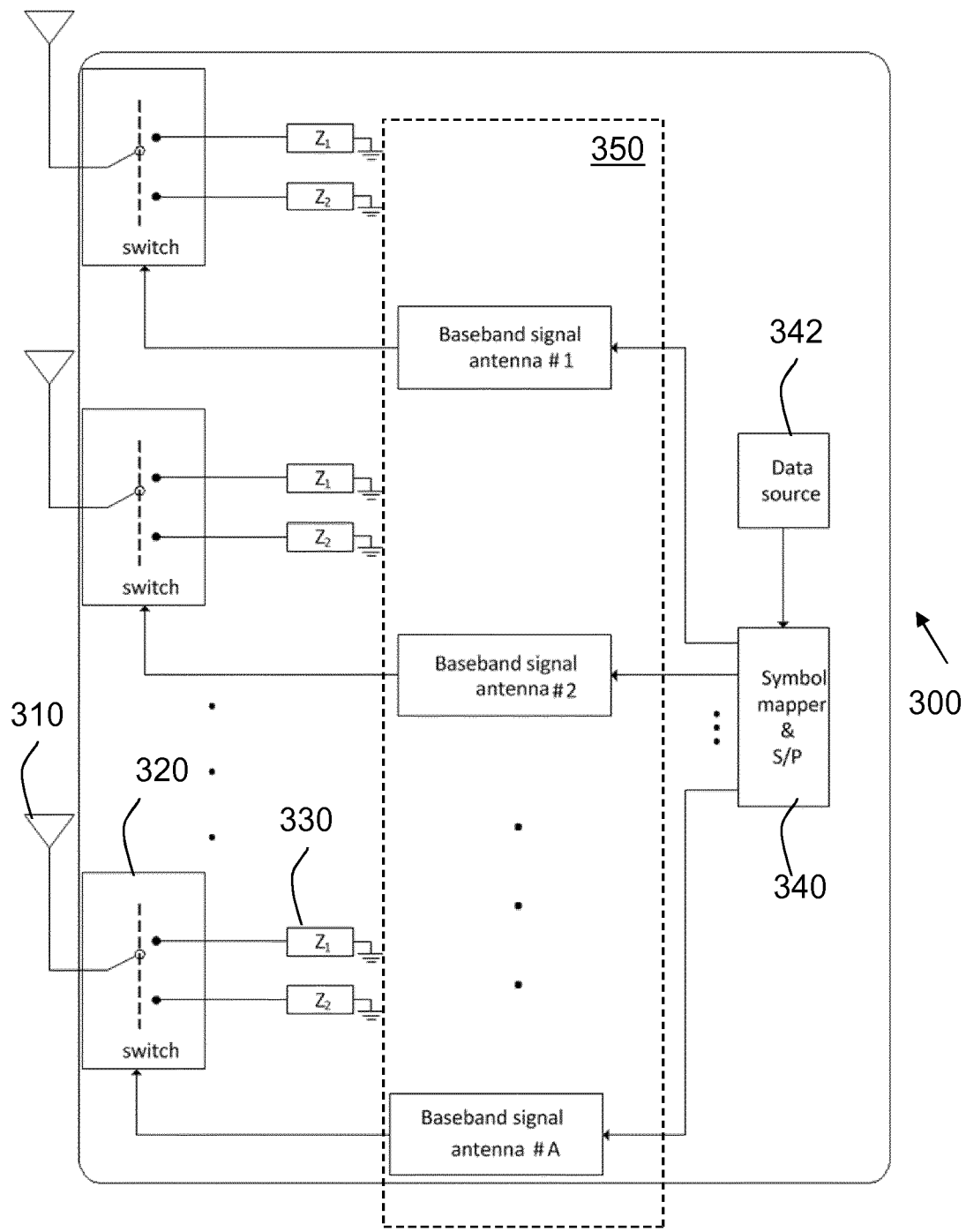
FIG. 3 is a schematic block diagram showing a wireless communication node according to embodiments herein.

In the example embodiment shown in FIG. 3, a semi-passive or passive device is provided with a plurality A of reflecting antennas. Each antenna or more generally group of antennas or antenna ports 310 is coupled to a variable impedance 330 by means of a switch 320. The switch can be in any of M states, corresponding to M different impedances. An example with M=2 is shown in FIG. 3. It will be assumed that it is possible to generate BPSK signals from each reflecting antenna by toggling the two states of the switch 320.

Table 2 illustrates the relation between the antenna impedances, phase shifts, baseband subcarrier signal and reflected wave from a single antenna. Notice that the baseband subcarrier signal takes on only two possible values, namely +1 and −1. It is assumed that the impinging RF carrier is of the form $\cos(2\pi f_c t)$, where $f_c$ is the carrier frequency. In this embodiment, the carrier frequency is chosen such that $f_c$ is located between two frequencies belonging to the channel raster of a multicarrier wireless system. $f_c$ may also be equal to one of those frequencies.

TABLE 1

Example of BPSK generation using backscattering and a 2 state switch with one antenna port

| Antenna impedance at time t | Phase shift imparted on reflected wave at time t [rads] | Value of baseband signal x(t) at time t | Reflected wave r(t) at time t |
|---|---|---|---|
| $Z_1$ | 0 | +1 | $\cos(2\pi f_c t)$ |
| $Z_2$ | $\pi$ | −1 | $-\cos(2\pi f_c t) = \cos(2\pi f_c t + \pi)$ |

With these assumptions, the signal r(t) reflected from one antenna may be written in the form $$r(t) = x(t) \cdot \cos(2\pi f_c t).$$

This expression for r(t) highlights the fact that the reflections may be generated by mixing the RF carrier $\cos(2\pi f_c t)$ and the baseband signal x(t), even though there are no mixers or other related RF circuitry. Rather, there is a 2-state switch controlling the antenna impedance to implement the mixing.

The baseband signal x(t) may be chosen to be an arbitrary square wave taking on the values +1 and −1. In practice the switching speed will limit the kind of square waveforms that are suitable, i.e. limit the range of $\Delta f$. For example, given a frequency $\Delta f$ and a phase $\beta$, one can generate a baseband signal that is a square wave with a period $1/\Delta f$ and phase $\beta$ as follows:

$$x(t) = \text{sign}(\cos(2\pi \Delta f t + \beta)).$$

$$\text{Here sign}(t) = \begin{cases} 1 & \text{if } t \geq 0 \\ -1 & \text{otherwise} \end{cases}.$$

To aid the intuition, one may define $$e(t) := x(t) - \cos(2\pi \Delta f t + \beta),$$

so that $$x(t) = \cos(2\pi \Delta f t + \beta) + e(t),$$

Where the term e(t) contains less than 20% of the total signal energy of x(t). Hence, as a rough approximation, one may think of x(t) as a tone with frequency $\Delta f$ and phase $\beta$. Using the trigonometric identity $2\cos(\delta)\cos(\theta) = \cos(\delta-\theta) + \cos(\delta+\theta)$, it is easy to see that mixing x(t) and $\cos(2\pi f_c t)$ yields two tones or images, one centered at $f_c - \Delta f$ and another at $f_c + \Delta f$, both having a phase shift with an magnitude of $|\beta|$. One of the images will have a phase shift equal to $-\beta$, while the other will have a phase shift equal to $+\beta$.

Figure 4:
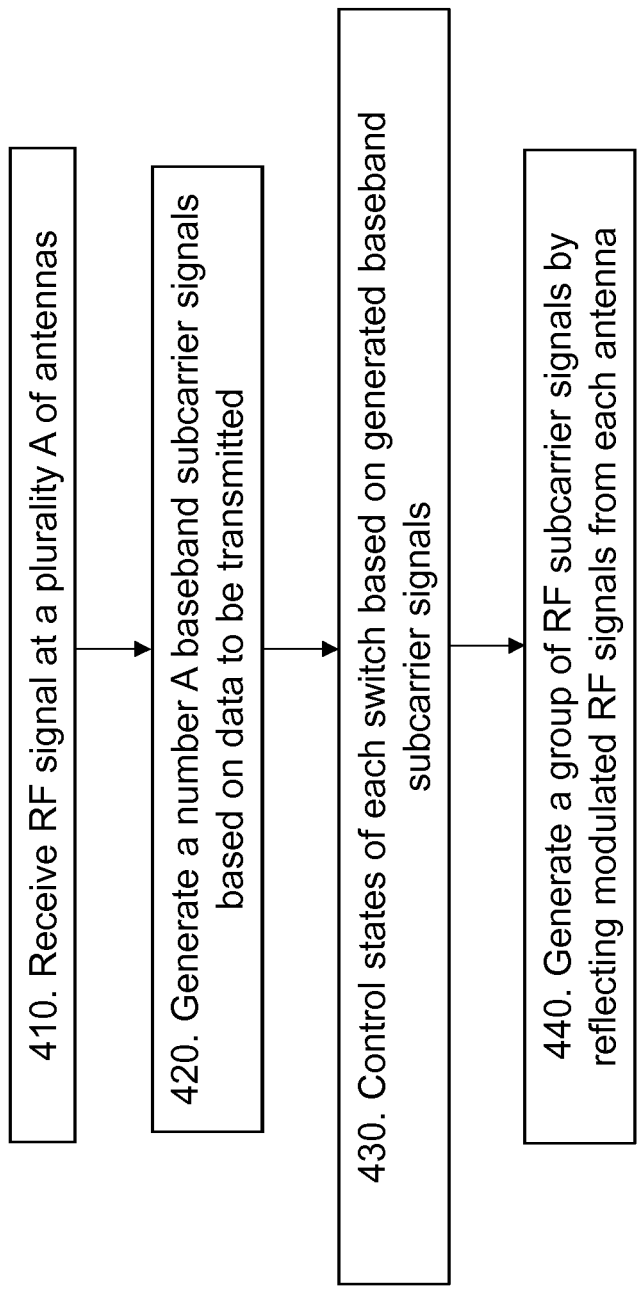
FIG. 4 is a flowchart depicting one embodiment of a method for generating multicarrier signals in a wireless communication node.

The following will describe, with reference to FIG. 4, a method of generating multicarrier signals by means of backscattering in the wireless communication node 300 in a multicarrier wireless communication system 100 according to one embodiment. The method comprises the following Actions, which actions may be performed in any suitable order.

Action 410

The wireless communication node 300 receives a radio frequency, RF, signal with a carrier frequency fc by a plurality A of antennas 310.

Action 420

The wireless communication node 300 generates a number A of baseband subcarrier signals based on the data to be transmitted by a symbol mapper, a serial to parallel converter and one or more modulators 340. Assume that data will be transmitted at a rate 1/T. The data to be transmitted in data source 342 is mapped to phases in, e.g. an MPSK constellation and converted to a number A of parallel streams, i.e. the number A of baseband subcarrier signals, for the plurality A of antennas 310.

If the data to be transmitted is represented by $\varphi_{a,n} \in \text{MPSK}$, $a=1, \ldots, A$; $n=1, \ldots, N$. Where the index a indicates the antenna number a, #a, while the index n indicates the signalling period.

For each antenna port a, a frequency $\Delta f_a$ is chosen such that both tones or images with frequency $(f_c + \Delta f_a)$ and $(f_c - \Delta f_a)$ belong to the channel raster of the multicarrier wireless communication system 100. In this way the reflected power from the two images is used for communications.

For each antenna port a=1, ..., A, a baseband subcarrier signal $x_a(t)$ is generated as follows:

$$x_a(t)=\text{sign}(\cos(2\pi\Delta f_a t+\varphi_{a,n})), nT \le t<(n+1)T.$$

That is, the baseband subcarrier signal has an antenna port specific frequency, and a phase that is constant during each signaling period of length T.

Action 430

The wireless communication node 300 controls states of a plurality A switches coupled to the plurality A antennas based on the generated baseband subcarrier signals such that each antenna impedance is selected among a number M of impedances, and thereby modulating the received RF signal at each antenna with its specific frequency baseband subcarrier signal.

Notice that it is possible for each baseband subcarrier signal $x_a(t)$ to take only the value +1 or −1, and modulate the state of the switch #a at time t according to Table 1. In this way, it is possible to generate multi-carrier signals by backscattering waves from multiple antennas, and using a two state switch at each antenna port.

Action 440

The wireless communication node 300 generates a group of RF subcarrier signals by reflecting the modulated RF signal from each antenna, and thereby generating the multicarrier signals from the plurality A antennas.

Figure 5:
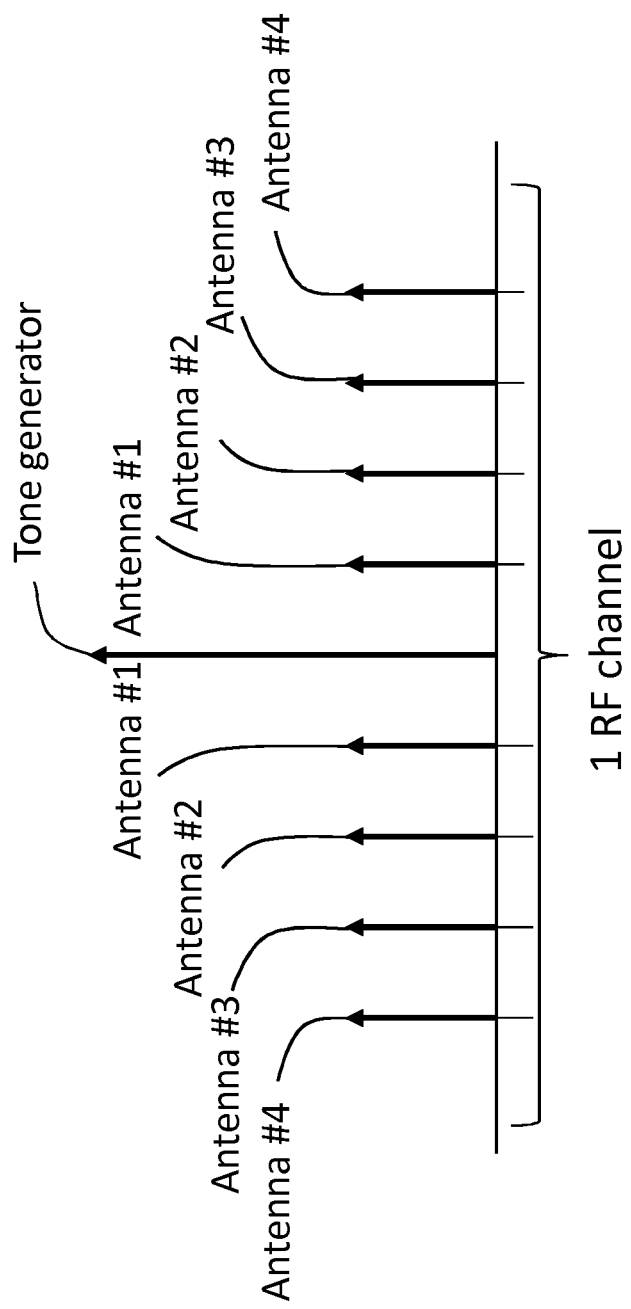
FIG. 5 is a diagram illustrating subcarrier placement in a semi-passive or passive device with 4 reflecting antennas.

FIG. 5 is a diagram illustrating subcarrier placement in a wireless communication node 300 with 4 reflecting antennas. The horizontal ticks indicate the frequencies in the channel raster of a multicarrier wireless system. Each antenna generates 2 sub-carriers, images of each other. Arrows with the same antenna number represent images generated through the same antenna.

Figure 6:
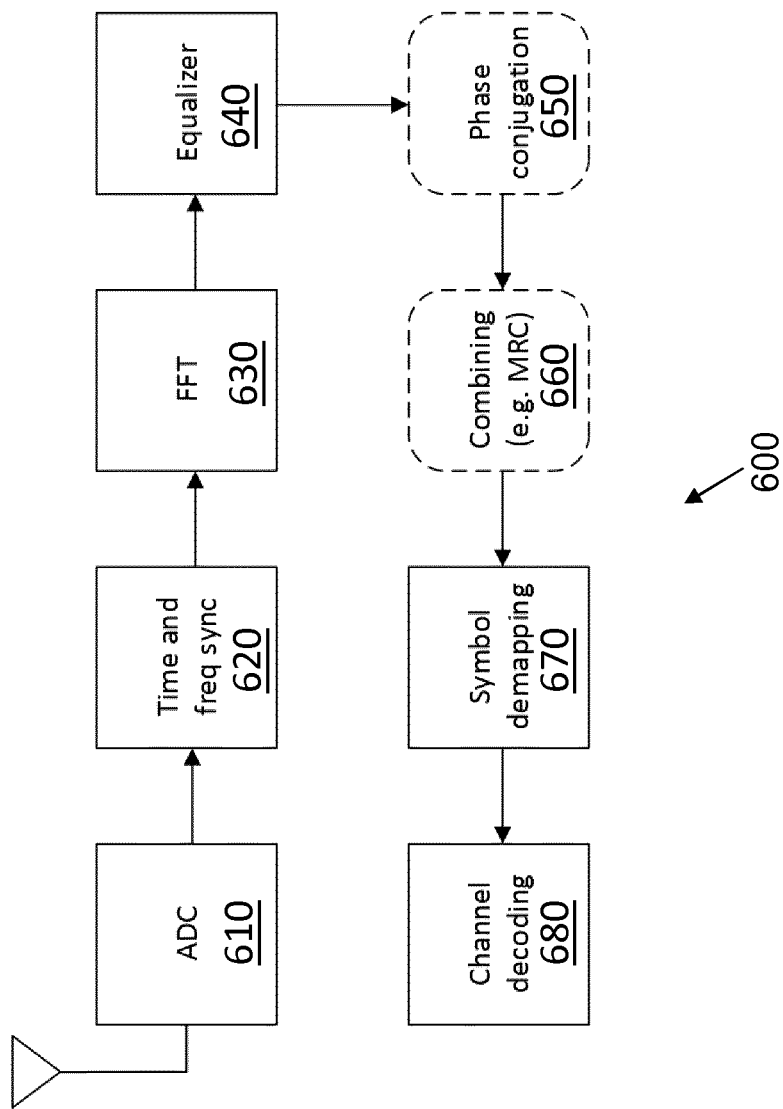
FIG. 6 is a block diagram illustrating a multicarrier receiver according to embodiments herein.

To receive the multicarrier signals transmitted by the wireless communication node 300, a multicarrier receiver e.g. an OFDM receiver, may be employed. Since the receiver gets 2 images of each subcarrier, it may benefit from frequency diversity. Moreover, the phases in the images will be complex conjugate to each other when considered as complex MPSK symbols, or equivalently, have opposite signs when considered as real-valued phases. FIG. 6 is a block diagram showing an example of a multicarrier receiver 600, e.g. an OFDM receiver, for receiving multicarrier signals transmitted by the wireless communication node 300 according to embodiments herein. The multicarrier signals are modulated by frequency domain data constellation symbols.

As any prior art receiver, the multicarrier receiver 600 is configured to down-convert the received multicarrier signal to a baseband signal and process the baseband signal. The multicarrier receiver 600 may comprise e.g. an analog to digital converter (ADC) 610, a time and frequency synchronization unit 620, a fast Fourier transform (FFT) unit 630, an equalizer unit 640 etc. As these units are prior art, their functions will not be described here. The multicarrier receiver 600 is further configured to transform the baseband signal to frequency domain and generating estimates of the frequency domain data constellation symbols, e.g. in the FFT unit 630. The multicarrier receiver 600 is further configured to identify pairs of subcarriers that are images to each other, which correspond to the subcarriers modulated by the same data bits. This may be performed in a phase conjugation unit as described below.

The dashed units shown in FIG. 6 are added new units compared to prior art. So the multicarrier receiver 600 further comprises a phase conjugation unit 650 and a combining unit 660 for processing the estimates of the frequency domain data constellation symbols. The phase conjugation unit 650 is configured to conjugate the estimated frequency domain constellation symbols corresponding to one subcarrier in each of the identified pairs of subcarriers. That is the phase conjugation unit 650 selects one of the subcarriers in each pair of images and conjugates the estimated constellation symbol.

The combining unit 660 is configured to combine the estimated frequency domain constellation symbol and conjugated frequency domain constellation symbol of each identified pair of subcarriers. The combining unit 660 combines the symbols e.g. by maximum ratio combining, corresponding to each pair of images. Note that the multicarrier receiver 600 may process the baseband signal in other order. For example, one can perform combining e.g. soft combining after demodulation.

The multicarrier receiver 600 further comprises a symbol de-mapping unit 670 and a channel decoding unit 680 as in prior art, and their functions will not be further described here.

Figure 7:
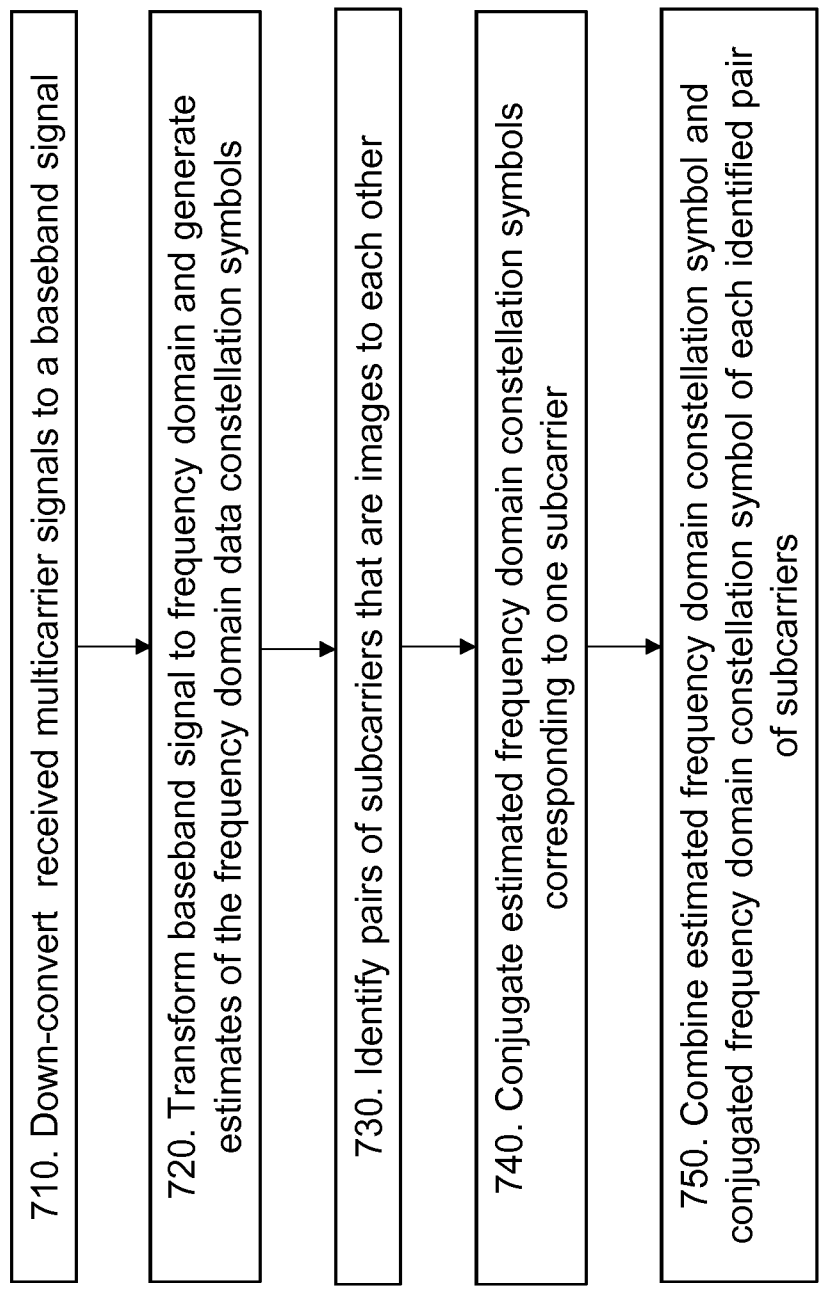
FIG. 7 is a flow chart depicting one embodiment of a method performed in a multicarrier receiver.

A method performed in the multicarrier receiver 600 for receiving multicarrier signals modulated with frequency domain data constellation symbols transmitted by the wireless communication node 300 will now be described with reference to FIG. 7. The method comprises the following actions, which actions may be performed in any suitable order.

Action 710

The multicarrier receiver 600 down-converts a received multicarrier signals to a baseband signal for processing. Then the multicarrier receiver 600 processes the baseband signal in the following action.

Action 720

The multicarrier receiver 600 transforms the baseband signal to frequency domain and generates estimates of the frequency domain data constellation symbols.

Action 730

The multicarrier receiver 600 identifies pairs of subcarriers that are images to each other, which correspond to the subcarriers modulated by the same data bits.

Action 740

The multicarrier receiver 600 conjugates the estimated frequency domain constellation symbols corresponding to one subcarrier in each of the identified pairs of subcarriers.

Action 750

The multicarrier receiver 600 combines the estimated frequency domain constellation symbol and conjugated frequency domain constellation symbol of each identified pair of subcarriers.

Figure 8:
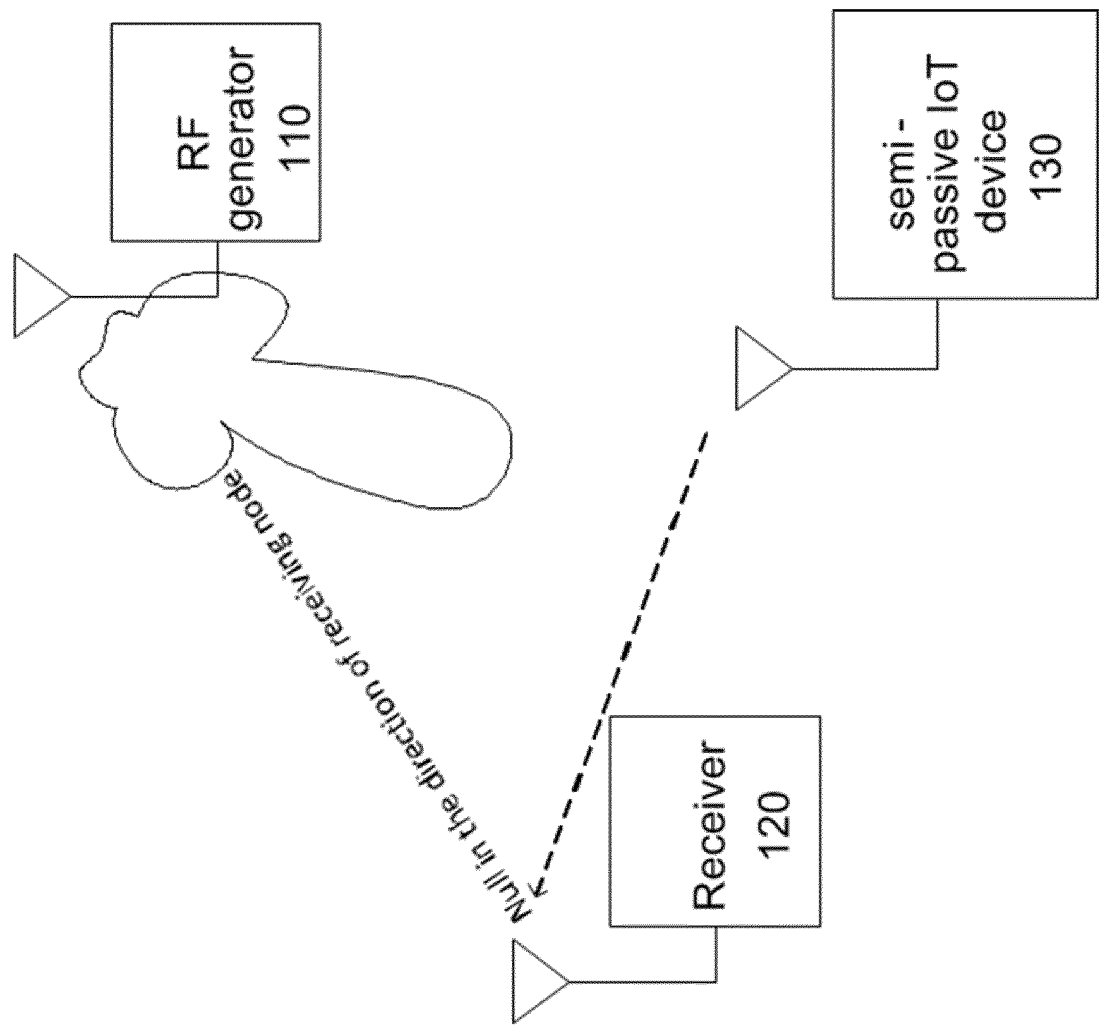
FIG. 8 Illustrating beamforming at an RF generator.

In the embodiment above, the signal generated by the RF generator 110 could have a carrier frequency very close to the frequency of the signal reflected by the IoT device. Moreover, the output power of the RF generator is larger than the power of the reflected signals. If the RF carrier is a pure tone and the multicarrier receiver is an OFDM receiver, then, in principle, the RF carrier is orthogonal to the subcarriers used for data transmission. However, depending on the path losses, the receiver may be blocked by the RF generator i.e. the so-called near-far problem. This problem can be alleviated by applying beamforming at the RF generator, as illustrated in FIG. 8. A null is placed in the direction of the receiver, thus attenuating the RF carrier power received at Receiver 120 and thereby reducing the blocking probability at the receiver.

According to one embodiment, the carrier frequency of the impinging RF signal may lie outside of the RF channel or Resource Unit (RU) in a multi-user, multicarrier system used by the semi or-passive device. For example, the reflected waves occupy a preassigned band, whereas the tone generator utilizes a guard band or a different band to transmit the RF carrier.

Figure 9:
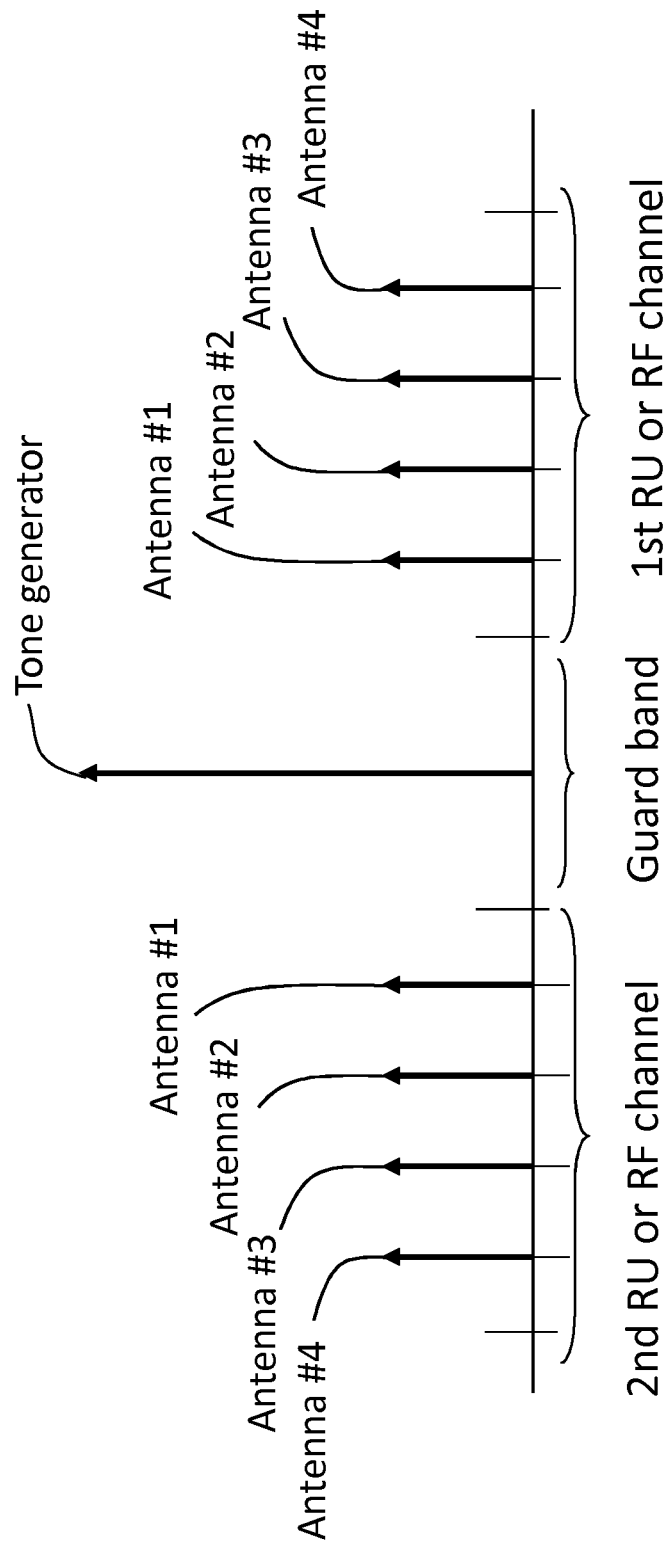
FIG. 9 is a diagram illustrating subcarrier placement in a semi-passive or passive device with 4 reflecting antennas.

The multicarrier RF signal is generated as described in the embodiment described above. The main difference is the placement of the subcarriers. An example is shown in FIG. 9 Illustrating subcarrier placement in a semi or/and passive device with 4 reflecting antennas. In this case, each subcarrier in a pair of images is located in a different RF channel. The vertical ticks indicate the frequencies in the channel raster of a multicarrier wireless system. Each antenna generates 2 sub-carriers, images of each other. Arrows with the same antenna number represent images generated through the same antenna.

To receive the multicarrier signals generated as shown in FIG. 9, the multicarrier receiver can be configured in two different ways:

The receiver may be configured to receive one of the two radio channels, e.g. the 1st RF channel in FIG. 9.

The receiver may be configured to receive both radio channels and to combine the signals from each pair of images.

As an example, the first RF channel may be the Wi-Fi channel #6 in the 2.4 GHz band, and the second RF channel may be the Wi-Fi channel #1 in the 2.4 GHz band. The receiver could support the 802.11 standard. If the receiver supports only 20 MHz bandwidth then it is configured to receive channel #6 or channel #1. If the receiver supports 40 MHz bandwidth, it may be able to receive both images of each sub-carrier and combined them to improve the receiver performance.

As in any multi-antenna system, there will be coupling among antennas, but since the energy re-radiated is only a fraction of the incoming energy, e.g. under 30 dB in 2.4 GHz, this should not pose a practical difficulty even if the transmitted constellation symbols require low EVM for detection.

According to some embodiment herein, each antenna element may be equipped with a reflection amplifier to further boost the reflected signal. Use of reflection amplifiers for backscattering may achieve a gain of approximately 10 dB.

Figure 10:
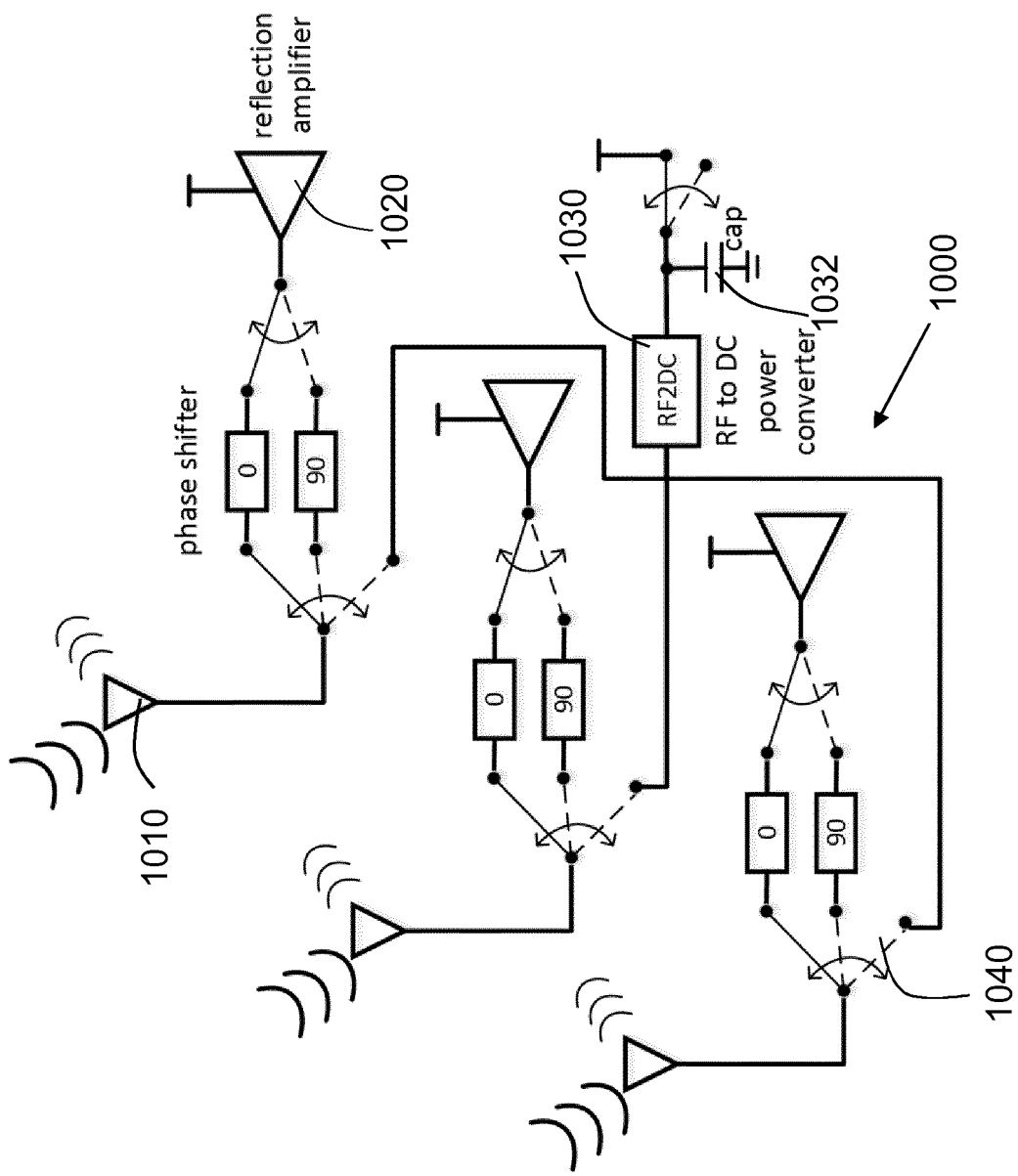
FIG. 10 is a block diagram illustrating a wireless communication node with antenna elements together with reflection amplifiers and energy scavenging unit according to embodiments herein.

The reflection amplifiers may be powered from a battery or from an energy scavenging unit 1000 as shown in FIG. 10, which may easily be expanded to a structure with any number of antennas. FIG. 10 shows a possible architecture for beamforming by backscattering with 3 antenna elements 1010 and using reflection amplifiers 1020 combined with RF energy scavenging.

The RF energy scavenging unit 1000 comprises an RF to DC power converter (RF2DC) 1030, which may be powered from the same RF carrier as is used for backscattering. The RF carrier is charging a capacitor 1032 while the signal is not being reflected by the antennas. A set of switches 1040 is used for controlling the structure in FIG. 10.

The RF energy scavenging may also be powered from another available RF carrier, but in that case it will most likely need another set of antennas.

For the structure in FIG. 10, there is a signal gain both from having multiple antennas and from having reflection amplifiers. Since all antenna elements may share the same unit for energy scavenging, the cost for adding this is almost constant or at least grows less than linear with the number of antennas.

Therefore, according to some embodiments herein, the wireless communication node 300 may further comprise a plurality A of reflection amplifiers 1020 coupled to the plurality A of antennas respectively.

According to some embodiments herein, the wireless communication node 300 may further comprise an energy scavenging unit 1030 configured to supply power for the plurality A reflection amplifiers.

According to some embodiments herein, the energy scavenging unit 1030 comprises an RF to DC power converter and configured to converter power of an RF signal received at a set of antennas to DC power. The set of antennas may be the same as the plurality A antennas for generating the multicarrier signals, then the wireless communication node may further comprise a set of switches 1040 configured to control the plurality A antennas for backscattering and energy scavenging.

Accordingly, the method for generating multicarrier signals by means of backscattering in a wireless communication node as shown in FIG. 4 may further comprise supplying power for the plurality A reflection amplifiers by an energy scavenging unit.

According to some embodiments, the method for generating multicarrier signals may further comprise converting power of an RF signal received at a set of antennas to DC power in the energy scavenging unit.

According to some embodiments, the set of antennas is the same as the plurality A antennas for generating the multicarrier signals, and the method may further comprise controlling the plurality A antennas for backscattering and energy scavenging by a set of switches.

To summarize, the embodiments herein provide an improved method and apparatus for generation of RF signals in passive and semi-passive devices. Multiple reflecting antennas are used to generate multicarrier signals. One subcarrier is generated from each antenna. Increasing the number of reflecting antennas increases substantially the transmission power of the wireless communication node 300, i.e. a passive or semi-passive device, at moderate increase in power consumption, thus allowing the extension of their transmitting range or data rate.

The utilization of multiple reflecting antennas has advantages in terms of improved coverage and/or higher data rates. Unlike classical active transmitters, the power consumption is increased only slightly when the number of antennas is increased, since there are no power amplifiers, filters or other power hungry components in the transmitter chain. Doubling the number of antennas doubles the reflected power. That is a power gain of up to 3 dB can be obtained when doubling the number of antennas.

It has been reported in prior art that a transmitter in passive Wi-Fi systems consumes several orders of magnitude less, e.g. 1000 times less, power than a transmitter in ordinary Wi-Fi systems. Even though increasing the number of antennas requires an increase in baseband processing and switching, the increase in power consumption should be tolerable in many IoT applications, given the magnitude of the transmitting power gains.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A wireless communication node for generating multicarrier signals by means of backscattering in a wireless communication system, the wireless communication node comprising:
    a plurality A of antennas configured to receive a radio frequency (RF) signal with a carrier frequency;
    a plurality A of switches, each one of the plurality A of switches having a number M of states;
    a number of impedance matrices, each impedance matrix comprising a number M of impedances; wherein each one of the plurality A of antennas is coupled to one of the impedance matrices by one of the plurality A switches;
    a symbol mapper, a serial to parallel converter, and one or more modulators configured to generate a number A of baseband subcarrier signals based on data symbols to be transmitted;
    wherein each one of the number A of baseband subcarrier signals is generated with an antenna specific frequency for each one of the plurality A of antennas;
    one or more switch controllers configured to control the states of the plurality A of switches based on the generated number A of baseband subcarrier signals such that a corresponding impedance is selected among the number M of impedances for each one of the plurality A of antennas, and thereby the received RF signal at each one of the plurality A of antennas is modulated by its specific frequency baseband subcarrier signal; and
    wherein a group of RF subcarrier signals is generated by reflecting the modulated RF signal from each antenna, and thereby the multicarrier signals are generated from the plurality A of antennas;
    wherein A and M are whole integer numbers.

2. The wireless communication node of claim 1, wherein the frequencies of the number A of baseband subcarrier signals are chosen such that frequencies of the group of RF subcarriers generated from each one of the plurality A of antennas have a center frequency corresponding to a center frequency of a subcarrier in the wireless communication system.

3. The wireless communication node of claim 1, wherein the group of RF subcarrier signals comprises one RF subcarrier signal, and wherein each one of the plurality A of antennas generates a different RF subcarrier signal.

4. The wireless communication node of claim 1, wherein a center frequency of the received RF signal corresponds to one frequency in a channel raster of the multicarrier wireless communication system.

5. The wireless communication node of claim 1, further comprising a plurality A of reflection amplifiers coupled to the plurality A of antennas respectively.

6. The wireless communication node of claim 5, further comprising an energy scavenging circuitry configured to supply power for the plurality A reflection amplifiers.

7. The wireless communication node of claim 6, wherein the energy scavenging circuitry is an RF to DC power converter and configured to convert power of an RF signal received at a set of antennas to DC power.

8. The wireless communication node of claim 7:
    wherein the set of antennas is the same as the plurality A antennas for generating the multicarrier signals; and
    wherein the wireless communication node further comprises a set of switches configured to control the plurality A antennas for backscattering and energy scavenging.

9. A method for generating multicarrier signals by means of backscattering in a wireless communication node in a multicarrier wireless communication system, the method comprising:
    receiving a radio frequency (RF) signal with a carrier frequency by a plurality A of antennas;
    generating a number A of baseband subcarrier signals based on data to be transmitted by a symbol mapper, a serial to parallel converter, and one or more modulators; wherein each one of the number A of baseband subcarrier signal is generated with a specific frequency for each one of the plurality A antennas;
    controlling states of a plurality A switches coupled to the plurality A antennas based on the generated number A of baseband subcarrier signals such that a corresponding impedance is selected among the number M of impedances for each one of the plurality A of antennas, thereby modulating the received RF signal at each one of the plurality A of antennas with its specific frequency baseband subcarrier signal; and
    generating a group of RF subcarrier signals by reflecting the modulated RF signal from each one of the plurality A of antennas, thereby generating the multicarrier signals from the plurality A antennas;
    wherein A and M are whole integer numbers.

10. The method of claim 9, wherein the frequencies of the number A of baseband signals are chosen such that frequencies of the subcarriers generated from each one of the plurality A of antennas has a center frequency corresponding to a center frequency of a subcarrier in the multicarrier wireless system.

11. The method of claim 9, wherein the group of RF subcarrier signals comprises one RF subcarrier signal, and wherein each one of the plurality A of antennas generates a different RF subcarrier signal.

12. The method of claim 9, wherein a center frequency of the received RF signal corresponds to one frequency in a channel raster of the multicarrier wireless communication system.

13. The method of claim 9, further comprising boosting the generated multicarrier signals by a plurality A of reflection amplifiers coupled to the plurality A of antennas respectively.

14. The method of claim 13, further comprising supplying power for the plurality A reflection amplifiers by energy scavenging circuitry.

15. The method of claim 14, further comprising converting power of an RF signal received at a set of antennas to DC power in the energy scavenging circuitry.

16. The method of claim 15:
    wherein the set of antennas is the same as the plurality A antennas for generating the multicarrier signals; and
    wherein the method further comprises controlling the plurality A antennas for backscattering and energy scavenging by a set of switches.

* * * * *